United States Patent [19]

Hattori et al.

[11] Patent Number: 5,216,096

[45] Date of Patent: Jun. 1, 1993

[54] PROCESS FOR THE PREPARATION OF CROSS-LINKED POLYMER PARTICLES

[75] Inventors: Masayuki Hattori; E. David Sudol; Mohamed S. El-Aasser, all of Bethlehem, Pa.

[73] Assignee: Japan Synthetic Rubber Co., Ltd., Japan

[21] Appl. No.: 764,444

[22] Filed: Sep. 24, 1991

[51] Int. Cl.$^5$ .............................................. C08F 2/08
[52] U.S. Cl. ................................ 526/201; 526/219.6; 526/227; 526/232.1; 526/346
[58] Field of Search .................... 526/201, 219.6, 227, 526/232.1

[56] References Cited

U.S. PATENT DOCUMENTS

| | | | |
|---|---|---|---|
| 4,174,430 | 11/1979 | Kido et al. | 526/336 |
| 4,419,245 | 12/1983 | Barrett et al. | 526/201 |
| 4,617,249 | 10/1986 | Ober et al. | 430/137 |
| 4,870,143 | 9/1989 | Hashiguchi et al. | 526/202 |
| 4,906,698 | 3/1990 | Kusano et al. | 525/242 |
| 4,908,392 | 3/1990 | Kusano et al. | 521/60 |
| 4,952,651 | 8/1990 | Kasai et al. | 526/201 |

OTHER PUBLICATIONS

Fifth Polymer Microspheres Symposium, Preprints; p. 22 (1988).
Sixth Polymeric Microsphere Symposium Preprints, 93–94 (1990).
Preparation of Microspheres by Radiation-Induced Polymeriation. I. Mechanism for the Formation of Monodisperse Poly(diethylene Glycol Dimethacrylate) Microspheres, J. Polym. Sci.: Part A, Polym. Chem., 29, 1197–1202 (1991).
Preparation of Micron-size Monodisperse Hydrogel Microspheres and Applications, J. Hasegawa, T. Fujimoto, H. Haneda, Y. Kataoka, 257–258 (1991).
Tseng et al., *Uniform Polymer Particles by Dispersion Polymerization in Alcohol*, J. Polymer Science, vol. 24, 1986, pp. 3000–3001.
Yoshida et al., *N-Acrylozysuccinimide-containing Copolymeric Microspheres*, J. Polymer Science, vol. 27, 1989, pp. 437–441.
Okubo et al., *Preparation of Micron-Size Monodisperse Polymer Microspheres*, Colloid Polym. Sci., vol. 269, 1991, pp. 217–218.
Barrett et al., *The Preparation of Polymer Dispersions in Organic Liquids*, New York, 1975, pp. 201, 232–233.

*Primary Examiner*—Joseph L. Schofer
*Assistant Examiner*—David Wu
*Attorney, Agent, or Firm*—Oliff & Berridge

[57] ABSTRACT

A process for the preparation of highly crosslinked polymer particles from polymerizable vinyl monomers comprising 15% by weight or more of a crosslinking vinyl monomer. The process comprises: providing an organic solvent, a mixture of organic solvents, or a mixture of at least one organic solvent and water which can dissolve the polymerizable vinyl monomers but cannot dissolve the polymer which is produced by the polymerization of the polymerizable vinyl monomers, the solubility in water of the polymerizable vinyl monomer being not more than 30% by weight, dispersing the polymerizable vinyl monomers into the organic solvent, the mixture of organic solvents, or the mixture of the at least one organic solvent and water, and polymerizing the polymerizable vinyl monomers in the presence of a dispersion stabilizer and a radical polymerization initiator. The crosslinked polymer particles have a comparatively uniform particle size within the particle size range of 0.1–10 μm. They are useful as a slip property improver for plastic films, a spacer for liquid crystal display devices, a carrier for chromatography, and a standard sample for microscopic examination.

15 Claims, 1 Drawing Sheet

PROCESS FOR THE PREPARATION OF CROSS-LINKED POLYMER PARTICLES

BACKGROUND OF THE INVENTION

Field of the Invention

This invention relates to a process for the preparation of highly crosslinked polymer particles having a comparatively uniform particle size within the average particle size range of 0.1–10 μm. The crosslinked polymer particles of the present invention are useful as a slip property improver for plastic films, a spacer for liquid crystal display devices, a carrier for chromatography, a standard sample for microscopic examination, and the like.

Description of the Background Art

There have been strong demands for highly crosslinked fine polymer particles with superior heat resistance and solvent resistance as various spacers, slip property improvers for plastic films, chromatographic carriers, and the like. None of the currently available polymer particles, however, are satisfactory in their strength, heat resistance, solvent resistance, particle size, and particle size distribution.

These conventional polymer particles are prepared by suspension polymerization, emulsion polymerization, seeded polymerization, dispersion polymerization, or the like.

In suspension polymerization, crosslinked polymer particles are prepared by polymerizing crosslinking monomers which are dispersed by a mechanical force in an aqueous medium as oil droplets. The mechanical dispersion of monomer droplets results in polymer particles with a wide particle size distribution, e.g., 1–50 μm, requiring classification of the polymer particles. Polymer particles with a narrow particle size distribution can be obtained only with a very low yield.

Emulsion polymerization can be used to polymerize monomers with a very small content of crosslinking monomers, i.e., usually up to 2%. In addition, emulsion polymerization generally can only produce polymer particles with very small particle sizes, usually in the range of 0.1–1 μm. Japanese Patent Laid-Open (ko-kai) No. 315454/1989 discloses a process for emulsion polymerization from a monomer mixture containing 20% or more of crosslinking monomers. This process, however, cannot produce crosslinked polymer particles with particle sizes greater than 1 μm. No known emulsion polymerization process can produce crosslinked polymer particles with a particle size greater than 1 μm.

Japanese Patent Laid-Open (ko-kai) No. 126288/1979 discloses a two step swelling and polymerization process; the first step comprises absorbing into seed particles an organic compound with a water solubility smaller than $10^{-2}$ g/l ($10^{-3}$% by weight) which acts as a swelling agent, and the second step comprises absorbing monomers with a certain degree of water solubility in an amount usually 20–300 times, but smaller than 1,000 times, the amount of the seed polymer, thus producing swollen particles. The swollen particles are then polymerized to produce polymer particles having the same shape as the swollen particles. This process can produce crosslinked polymer particles with particle sizes greater than 1 μm and a narrow particle size distribution, if a large amount of crosslinking monomers is used. A drawback of this process is the long period of time required for completing the first step. Since the water solubility of the swelling agent is extremely small, it takes a long time to disperse the swelling agent into water and absorb it into the seed polymer. In addition, if oil droplets of the monomers are not completely absorbed into the seed polymers, they produce large polymer particles, requiring classification of the resulting crosslinked polymer particles.

With respect to dispersion polymerization, J. Polym. Sci., Polym. Chem. 24, 2995 (1986) reports that divinylbenzene, as a crosslinking agent, can be used up to 0.6% by weight in the dispersion polymerization of styrene, but the use of a greater amount of divinylbenzene gives rise to inadequate dispersion stability and cannot produce polymer particles. J. Polym. Sci.: Part C: Polym. Letters 27, 437 (1989) and Fifth Polymer Microspheres Symposium (Tokyo), Preprints, page 22, (1988) summarize a technique of preparing highly crosslinked polymer particles using diethylene glycol dimethacrylate as a crosslinking monomer by radiation polymerization in an organic solvent such as ethyl propionate or dimethylformamide or ethyl acetate without using a dispersing stabilizer. A drawback of the radiation polymerization is that it requires a special device and necessitates that the polymerization reaction be carried out without agitation for obtaining a stable dispersion. Because of these factors, the conversion which can be achieved is no more than 80%, making it difficult to produce uniform crosslinked polymer particles on a large scale. Colloid Polym. Sci., 269: 217–221 (1991) reports an attempt to produce micron-size monodisperse polymer microspheres having crosslinked structures and vinyl groups by batch dispersion co-polymerization of styrene and divinylbenzene under various conditions. However, particles having good monodispersity and colloidal stability could not be obtained. Therefore, seeded copolymerization of styrene and divinylbenzene were carried out in the presence of micron-size monodisperse polystyrene seed particles which were prepared by dispersion polymerization. But these particles had inadequate heat resistance or solvent resistance due to the use of a high amount of noncrosslinked polymer which came from the seed particles (more than 50% by weight of final particles). Japanese Patent Laid-Open (ko-kai) No. 26617/1989, admitting that when more than 2.0% of crosslinking monomers are used, it is very difficult to obtain crosslinked polymer particles by dispersion polymerization because of coagulation of particles, proposes a process for preparing highly crosslinked polymer particles by first preparing low crosslinked polymer particles and then absorbing other highly crosslinking monomers into the low crosslinked polymer particles which function as a seed polymer. The process involves an extremely complicated procedure for converting the organic solvent dispersion system of the seed particles into an aqueous dispersion system when highly crosslinking monomers are polymerized. In addition, absorption of monomers into the seed is incomplete, resulting in large particles due to unabsorbed monomers. "Dispersion Polymerization in Organic Media" by Barret, Wiley, New York (1975) describes on page 232 a process for the production of crosslinked polymer particles by first producing the main particles and then effecting a crosslinking reaction, in order to overcome the inability of direct production of highly crosslinked particles by the dispersion polymerization. The process has drawbacks in that limited combinations of monomers can be used and in the inadequate heat resistance or solvent resistance of the particles due to an insufficient degree of crosslinking.

Sixth Polymeric Microspheres Symposium (Fukui) Preprints, page 93, (1990) summarizes a technique for preparing hydrogel particles using more than 50% of acrylamide and about 20% by weight of methylenebisacrylamide as a crosslinking monomer by dispersion polymerization in isopropylalcohol. A drawback of this process is the inadequate water resistance of the particles due to their high hydrophilicity. These hydrogel particles were swollen by more than 3 times their volume with water in spite of using a high amount of crosslinking monomer.

SUMMARY OF THE INVENTION

The present inventors have undertaken extensive studies in order to solve the above problems in obtaining highly crosslinked polymer particles and to provide a process for the preparation of highly crosslinked polymer particles having a comparatively uniform particle size within the average particle size range of 0.1–10 μm, and yet having excellent heat resistance and solvent resistance. As a result, the present inventors have found that dispersion polymerization of specific polymerizable vinyl monomers comprising a specific amount of crosslinking vinyl monomers in a specific organic solvent in the presence of a dispersion stabilizer and a radical polymerization initiator can produce highly crosslinked polymer particles.

According to the present invention, there is provided a process for preparing highly crosslinked polymer particles, the process comprising dispersing polymerizable vinyl monomer in a solvent, the polymerizable vinyl monomer comprising at least 15% by weight of crosslinking vinyl monomer, the solvent comprising at least one organic compound, the polymerizable vinyl monomer being soluble in the solvent, the solubility in water of the polymerizable vinyl monomer being not more than 30% by weight; and polymerizing the polymerizable vinyl monomer in the presence of a dispersion stabilizer and a radical polymerization initiator to produce polymer of the polymerizable vinyl monomer, the polymer being insoluble in the solvent.

Other and further objects, features and advantages of the invention will appear more fully from the following description.

DETAILED DESCRIPTION OF THE INVENTION AND PREFERRED EMBODIMENTS

Figure 1:
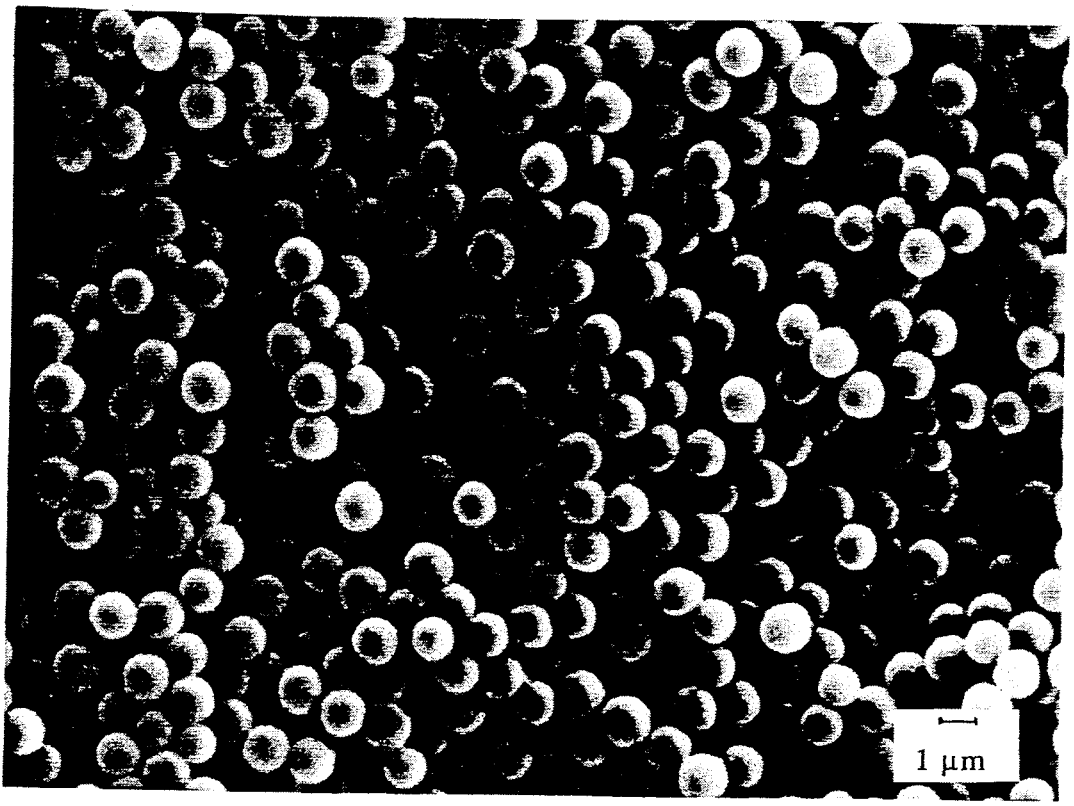
FIG. 1 is a scanning electron photograph of crosslinked polymer particles prepared in Example 1.
Figure 2:
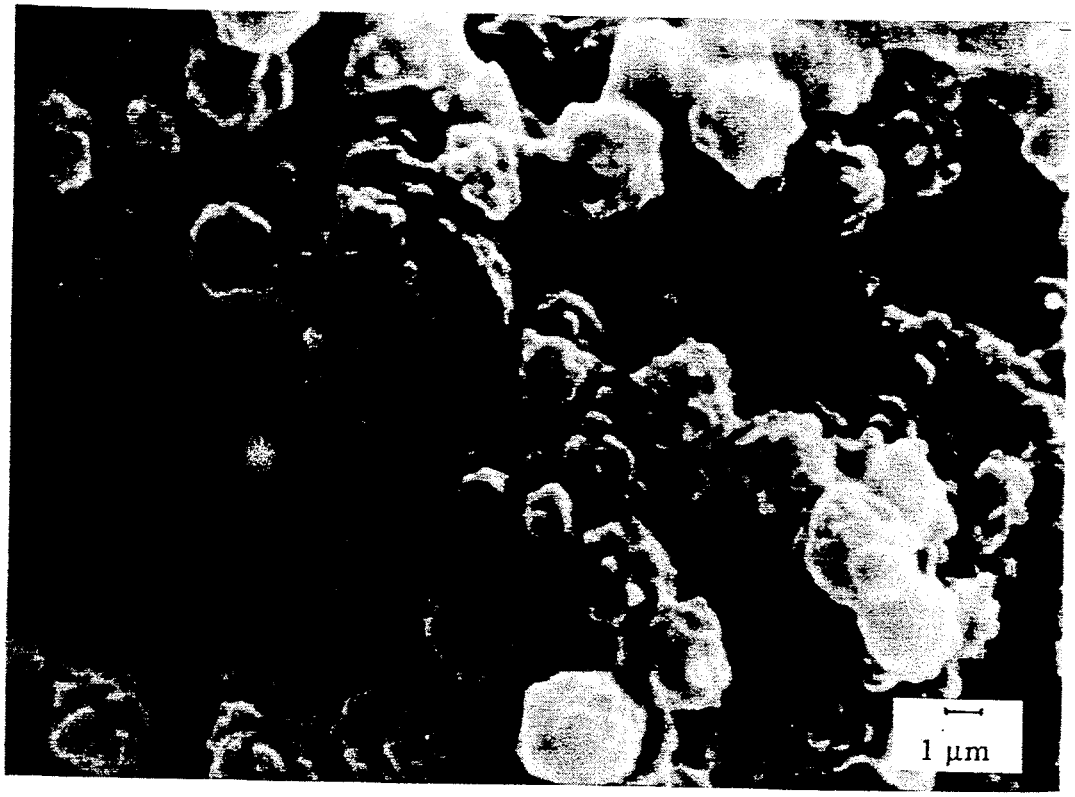
FIG. 2 is a scanning electron photograph of polymer particles prepared in Comparative Example 2.

The use of a dispersion stabilizer in the preparation of crosslinked polymer particles is essential in the present invention for promoting the dispersion stability of the polymer particles so as to prevent them from coagulating, deforming, or fusing. Various synthetic high molecular weight compounds, including homopolymers, copolymers, block copolymers, and the like, sorbitan esters, and natural high molecular compounds, as well as their derivatives can be used as a dispersion stabilizer. Specific examples of suitable dispersion stabilizers are poly(vinyl pyrrolidone), poly(vinyl methyl ether), polyethyleneimine, polyacrylic acid, poly(vinyl alcohol), vinyl acetate copolymer, ethyl cellulose, hydroxypropyl cellulose, sorbitan stearic acid monoester, and the like.

In order to further promote the dispersion stability and to effect a stable polymerization reaction, a co-stabilization agent may be added in addition to the dispersion stabilizer. Anionic surfactants, nonionic surfactants, quaternary ammonium salts, long chain alcohols, and the like may be used as a co-stabilization agent. Specific examples of desirable co-stabilization agents are sodium di'(2-ethylhexyl)sulfosuccinate, nonylphenoxypolyethoxy ethanol, methyltricaprylammonium chloride, cetyl alcohol, and the like.

Preferable radical polymerization initiators which can be used in the process of the present invention are azo compounds such as 2,2'-azobisisobutyronitrile, 4,4'-azobis(4-cyanopentanoic acid), 2,2'-azobis(2-methylbutyronitrile), and 2,2'-azobis(2,4-dimethylvaleronitrile); peroxides such as benzoyl peroxide, lauroyl peroxide, octanoyl peroxide, and 3,3',5-trimethylhexanoyl peroxide; and the like.

Organic solvents which can be used in the process of the present invention include alcohols, e.g., methyl alcohol, ethyl alcohol, denatured ethyl alcohol, isopropyl alcohol, butyl alcohol, amyl alcohol, octyl alcohol, benzyl alcohol, cyclohexanol, ethylene glycol, glycerol, and diethylene glycol; ether alcohols, e.g., methyl cellosolve, cellosolve, butyl cellosolve, isopropyl cellosolve, ethylene glycol monomethyl ether, ethylene glycol monoethyl ether, diethylene glycol monomethyl ether, and diethylene glycol monoethyl ether; hydrocarbons, e.g., hexane, octane, petroleum ether, cyclohexane, benzene, toluene, and xylene; halogenated hydrocarbons, e.g., carbon tetrachloride, trichloroethylene, tetrabromoethane; ethers, e.g., ethyl ether, dimethyl glycol, trioxane and tetrahydrofuran; acetals, e.g., methylal and diethylene acetal; ketones, e.g., acetone, methyl ethyl ketone, methyl isobutyl ketone, and cyclohexane; esters, e.g., methyl formate, butyl acetate, ethyl acetate, ethyl propionate, and cellosolve acetate; acids, e.g., formic acid and propionic acid; sulfur- or nitrogen-containing organic compounds, e.g., nitropropene, nitrobenzene, dimethylamine, monoethanolamine, pyridine, dimethylsulfoxide, and dimethylformamide; and the like, and isomers thereof. These organic solvents can be used either independently or in combination of two or more. They can also be used mixed with water to the extent that the vinyl monomers to be polymerized are dissolved in such a mixture.

The total amount of solvent is preferably at least 500 parts, preferably 600 parts by weight, and more preferably 700 parts per 100 parts by weight of the total weight of monomer components. If the total amount of solvent is too low, the polymer particles are irregularly agglomerated or fused to each other, producing no uniform particles.

Crosslinking vinyl monomers which can preferably be used in the present invention are compounds having two or more (preferably two) of copolymerizable double bonds in the molecule, such as nonconjugated divinyl compounds typified by divinylbenzene and polyvalent acrylate compounds typified by trimethylolpropane trimethacrylate and trimethylolpropane triacrylate.

The following acrylate compounds are given as specific examples of polyvalent acrylate compounds which may be used in the present invention.

Diacrylate Compounds

Polyethylene glycol diacrylate, 1,3-butylene glycol diacrylate, 1,6-hexane glycol diacrylate, neopentyl glycol diacrylate, polypropylene glycol diacrylate, 2,2'-bis(4-acryloxypropyloxyphenyl) propane, and 2, 2'-bis (4-acryloxydiethoxyphenyl) propane.

Triacrylate Compounds

Trimethylolpropane triacrylate, trimethylolethane triacrylate, and tetramethylolmethane triacrylate.

Tetraacrylate Compounds

Tetramethylolmethane tetraacrylate.

Dimethacrylate Compounds

Ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexane glycol dimethacrylate, neopentyl glycol dimethacrylate, dipropylene glycol dimethacrylate, and 2,2'-bis(4-methacryloxydiethoxyphenyl)propane.

Trimethacrylate Compounds

Trimethylolpropane trimethacrylate and trimethylolethane trimethacrylate.

Of the above crosslinking vinyl monomers, divinylbenzene, ethylene glycol dimethacrylate, and trimethylolpropane trimethacrylate are particularly preferable, and divinylbenzene is the most preferable compound.

These crosslinking vinyl monomers can be used either independently or in combinations of two or more.

The proportion of crosslinking vinyl monomers in the total vinyl monomers used in the present invention is at least 15% by weight ( unless otherwise indicated, all percentages herein are by weight), preferably 20% by weight, and more preferably 25% by weight. If the proportion of crosslinking vinyl monomers is less than 15% by weight but not less than 2% by weight, the polymer particles are irregularly agglomerated or fused to each other, producing no uniform particles. If the proportion is less than 2% by weight, the resulting particles, even though they may be uniform in their particle size, have only such a low degree of crosslinking that they have not enough heat resistance and solvent resistance to be usable in applications intended in the present invention.

The amounts of crosslinking vinyl monomers herein referred to are the amounts of pure such monomers, excluding the amounts of diluents, impurities, and the like.

Polymerizable vinyl monomers which can be used together with crosslinking vinyl monomers in the present invention include aromatic monovinyl compounds, e.g., styrene, ethyl vinylbenzene, α-methylstyrene, fluorostyrene, and vinylpyridine; cyanated vinyl compounds, e.g., acrylonitrile and methacrylonitrile; acrylate monomers, e.g., butyl acrylate, 2-ethylhexylethyl acrylate, glycidyl acrylate, and N,N'-dimethylaminoethyl acrylate; methacrylate monomers, e.g., butyl methacrylate, 2-ethylhexylethyl methacrylate, methyl methacrylate, 2-hydroxyethyl methacrylate, glycidyl methacrylate, and N,N'-dimethylaminoethyl methacrylate; mono- or dicarboxylic acids or dicarboxylic acid anhydrides, e.g., acrylic acid, methacrylic acid, maleic acid, and itaconic acid; amide compounds, e.g., acrylamide and methacrylamide; and the like, so long as the solubility in water of the total vinyl monomers is not more than 30% by weight. In addition to the above compounds, conjugated diene compounds (e.g., butadiene, isoprene), vinyl esters vinyl acetate), α-olefins (e.g., 4-methyl-1-pentene), and the like can be used to the extent allowable in respect of the rate of polymerization and the polymerization stability. Of the above polymerizable vinyl monomers, styrene and ethyl vinylbenzene are particularly preferable. The use of two or more of these polymerizable vinyl monomers is allowable. The solubility in water of the total vinyl monomers is not more than 30% by weight and preferably not more than 10% by weight. If the solubility in water of the total vinyl monomer is more than 30%, the polymer particles have poor water resistance and the application of these particles is limited.

In the present invention in order to produce crosslinked polymer particles with particle diameters of 3 μm or greater, seed particles may optionally be used under the conditions wherein new particles are not produced in a large amount. In this instance, the use of highly crosslinked polymer particles produced in the process of the present invention as seed particles is preferable for obtaining the crosslinked polymer particles with high heat resistance and solvent resistance.

In order to control the particle size of the crosslinked polymer particles to be smaller than 1 μm, on the other hand, use of a latex produced by a conventional emulsion polymerization as seed particles is preferable.

Polymerizable vinyl monomers may be added to the reaction vessel at one time before the polymerization reaction, or may be added continuously or dividedly together with dispersion stabilizers, polymerization initiators, solvents, and the like, while the polymerization reaction proceeds.

The polymerization reaction may be carried out at a temperature between 40°–90° C., and preferably 50°–80° C. for a duration between about 3 hours and 40 hours, preferably between about 6 hours and about 30 hours. The polymerization reaction is conducted in a suitable atmosphere, such as a nitrogen gas atmosphere, preferably with suitable agitation. Too much agitation tends to cause coagulation.

Other features of the invention will become apparent in the course of the following description of exemplary embodiments which are given for illustration of the invention and are not intended to be limiting thereof.

| Example 1 | |
|---|---|
| Divinyl Benzene 55 *1 | 110 gm |
| Poly(vinyl Pyrrolidone) K-30 *2 | 22 gm |
| 2,2'-azobisisobutyronitrile | 11 gm |
| Methyl alcohol | 1,100 gm |

*1 Trademark, a product of Dow Chemical Co., purity: 55% (the remainder is monofunctional vinyl monomers consisting of about 41% by weight ethyl vinyl benzene and about 4% by weight diethyl benzene), crosslinking vinyl monomers: 55.0%
*2 Trademark, a product of GAF Co.

The above components were placed in a 2 l flask and polymerized at 70° C.. in a nitrogen gas atmosphere for 24 hours while stirring. The final conversion achieved in the polymerization reaction was 94%. The polymer particles thus obtained were examined by a scanning electron microscope to confirm that they are spherical particles with high mono-dispersibility with an average size of 1.4 μm (SD (Standard Deviation)=7%).

Comparative Example 1

| | |
|---|---|
| Divinyl Benzene 55 | 22 gm |
| Styrene | 88 gm |
| (the proportion of crosslinking vinyl monomers: 11.0%) | |
| Poly(vinyl Pyrrolidone) K-30 | 22 gm |
| 2,2'-azobisisobutyronitrile | 11 gm |
| Methyl alcohol | 1,100 gm |

The above components were placed in a 2 l flask and stirred while raising the temperature. The mixture lost fluidity in 3 hours and polymerized in 24 hours. The polymer particles thus obtained were observed by a scanning electron microscope to confirm that they are irregularly fused and cannot be used as polymer particles.

EXAMPLES 2–4 AND COMPARATIVE EXAMPLES 2–5

Crosslinked polymer particles were prepared in the same manner as in Example 1, provided that the proportion of crosslinking vinyl monomers in Example 1 was changed to 44% (Example 2), 33% (Example 3), and 22% (Example 4) by the use of styrene in the monomer mixtures.

For Comparative Examples 2–5, the same procedure was followed as in Comparative Example 1, except that the proportion of crosslinking vinyl monomers in Comparative Example 1 was 5.5% (Comparative Example 2), 2.0% (Comparative Example 3), 1.0% (Comparative Example 4), and 0% (Comparative Example 5).

Solvent resistance and heat resistance of the products were determined according to the following methods.

Solvent Resistance 0.5 gm of powdered polymer particles were dispersed in 50 ml of toluene and kept at 25° C. for 48 hours to swell. Particle sizes of the swollen particles were measured using an optical microscope. The amount of solvent absorbed into the particles which was calculated from the enlarged particle sizes was taken as a measure of solvent resistance.

Heat Resistance 0.2 gm of powdered polymer particles were heated at 300° C. in a nitrogen gas atmosphere for 5 hours to measure the decrease in the weight, which was taken as a measure of heat resistance.

The results are shown in Table 1.

As shown in Table 1, polymers in Comparative Examples 1 and 2 were totally coagulated during the polymerization reaction. Even though polymer particles could be produced in Comparative Examples 3–5, they had such poor solvent resistance that they were dissolved or greatly swollen in the solvent. These polymer particles also exhibited very low heat resistance, indicating that they are apt to decompose with heat.

TABLE 1

| | Example | | | | Comparative Example | | | | |
|---|---|---|---|---|---|---|---|---|---|
| | 1 | 2 | 3 | 4 | 1 | 2 | 3 | 4 | 5 |
| Proportion of Crosslinking Vinyl Monomers (%) | 55.0 | 44.0 | 33.0 | 22.0 | 11.0 | 5.5 | 2.0 | 1.0 | 0.0 |
| Amount of Coagulated Polymers (wt. %) | 0.00 | 0.00 | 0.05 | 5.90 | * | * | 12.0 | 0.08 | 0.00 |
| Final Conversion (%) | 94 | 96 | 95 | 90 | — | — | 89 | 93 | 96 |
| Average Particle Size (μm) | 1.4 | 1.2 | 1.1 | 1.0 | — | — | 3.4 | 3.6 | 3.9 |
| Standard Deviation (%) | 7 | 8 | 10 | 18 | — | — | 7 | 6 | 6 |
| Solvent Resistance Swollen Volume (%) | 0 | 0 | 2 | 7 | — | — | 259 | 523 | ** |
| Heat Resistance Decreased Amount (%) | 9 | 9 | 10 | 18 | — | — | 58 | 77 | 89 |

*All polymers coagulated.
**Polymer particles dissolved in toluene.

Example 5

| | |
|---|---|
| Ethylene glycol dimethacrylate | 165 gm |
| (the proportion of crosslinking vinyl monomers: 100.0%) | |
| Poly(vinyl Pyrrolidone) K-30 | 22.0 gm |
| Aerosol OT-75 *3 (Sodium dioctyl sulfosuccinate) | 2.0 gm |
| 2,2'-azobisisobutyronitrile | 11 gm |
| Methyl alcohol | 800 gm |
| Distilled water | 300 gm |

*3 Trademark, a product of American Cyanamid Co.
Purity 75% (the remainder is water and alcohol)

The above components were placed in a 2 l flask and polymerized at 70° C. in a nitrogen gas atmosphere while stirring. The final conversion achieved in the polymerization reaction was 92%. The polymer particles thus obtained were examined by a transmission electron microscope to confirm that they are spherical crosslinked polymer particles with an average particle size of 0.41 μm (SD=9%).

Example 6

| | |
|---|---|
| Divinyl Benzene HP | 110 gm |
| (the proportion of crosslinking vinyl monomers: 80.0%) | |
| SPAN 60 *4 (Sorbitan monostearate) | 33 gm |
| Lauroyl peroxide | 11 gm |
| Isooctane | 1,100 gm |

*4 Trademark, a product of ICI Americas Inc.

The above components were placed in a 2 l flask and polymerized at 70° C. in a nitrogen gas atmosphere while stirring. The final conversion achieved in the polymerization reaction was 94%. The polymer particles thus obtained were examined by a scanning electron microscope to confirm that they are spherical crosslinked polymer particles with an average particle size of 7.1 μm (SD=21%).

Example 7

| | |
|---|---|
| Divinyl Benzene 55 | 110.0 gm |
| (the proportion of crosslinking vinyl monomers: 55%) | |
| Poly(vinyl Pyrrolidone) K-30 | 22.0 gm |
| 2,2'-azobisisobutyronitrile | 11.0 gm |
| Methyl alcohol | 1,000 gm |
| o-Xylene | 255.0 gm |

The above components were placed in a 2 l flask and polymerized at 70° C. in a nitrogen gas atmosphere while stirring. The final conversion achieved in the polymerization reaction was 91%. The polymer particles thus obtained were examined by a scanning electron microscope to confirm that they are spherical crosslinked polymer particles with an average particle size of 2.9 μm (SD=9%).

| Example 8 | |
|---|---|
| Divinyl Benzene 55 | 110.0 gm |
| (the proportion of crosslinking vinyl monomers: 55%) | |
| Poly(vinyl Pyrrolidone) K-30 | 22.0 gm |
| 2,2'-azobis(2,4-dimethylvaleronitrile) | 22.0 gm |
| Isopropyl alcohol | 1,000 gm |
| Toluene | 220.0 gm |

The above components were placed in a 2 l flask and stirred at 25° C. to completely dissolve these components. After stopping the stirring, the temperature was raised to 70° C. and the mixture was polymerized in a nitrogen gas atmosphere. The polymerization reaction was continued for 40 hours while gently stirring the mixture at a rate of 40 rpm in order to prevent the sedimentation of the particles. The final conversion achieved in the polymerization reaction was 87%. The polymer particles thus obtained were examined by a scanning electron microscope to confirm that they have an average particle size of 3.9 μm (SD=13%).

| Example 9 <Preparation of Seed Polymer Particles A> | |
|---|---|
| Styrene | 490 gm |
| Methacrylic acid | 10 gm |
| t-Dodecylmercaptan | 10 gm |
| Sodium Dodecylbenzenesulfonate | 2 gm |
| Potassium persulfate | 2 gm |
| Ion exchanged water | 1,000 gm |

The above components were placed in a 2 l flask and polymerized at 70° C. in a nitrogen gas atmosphere for 10 hours while stirring. The final conversion achieved in the polymerization reaction was 97%. The polymer particles (Seed Polymer Particles A) thus obtained were examined by a transmission electron microscope to confirm that they are polymer particles having relatively high mono-dispersibility with an average particle size of 0.21 μm (SD=3%).

| <Preparation of Crosslinked Polymer Particles> | |
|---|---|
| Seed Polymer Particles A | 4.2 gm |
| (As solid portion) | |
| Divinyl Benzene 55 | 88.0 gm |
| Styrene | 22.0 gm |
| (the proportion of crosslinking vinyl monomers: 44%) | |
| Poly(vinyl Pyrrolidone) K-30 | 22.0 gm |
| 2,2'-azobisisobutyronitrile | 8.8 gm |
| Methyl alcohol | 1,000.0 gm |

The above components were placed in a 2 l flask and polymerized at 70° C. in a nitrogen gas atmosphere while stirring. The final conversion achieved in the polymerization reaction was 96%. The polymer particles thus obtained were examined by a transmission electron microscope to confirm that they are spherical polymer particles having high mono-dispersibility with an average particle size of 0.61 μm (SD=3%).

| Example 10 <Preparation of Seed Polymer Particles B> | |
|---|---|
| Seed Polymer Particles A | 12 gm |
| (As solid portion) | |
| Styrene | 490 gm |
| Methacrylic acid | 10 gm |
| t-Dodecylmercaptan | 10 gm |
| Sodium Dodecylbenzene sulfonate | 0.2 gm |
| Potassium persulfate | 2 gm |
| Ion exchanged water | 1,000 gm |

The above components were placed in a 2 l flask and polymerized at 70° C. in a nitrogen gas atmosphere for 24 hours while stirring. The final conversion achieved in the polymerization reaction was 93%. The polymer particles (Seed Polymer Particles B) thus obtained were examined by a transmission electron microscope to confirm that they are polymer particles having relatively high mono-dispersibility with an average particle size of 0.72 μm (SD=3%).

| <Preparation of Seed Polymer Particles C> | |
|---|---|
| Seed Polymer Particles B | 1.5 gm |
| (As solid portion) | |
| Divinyl Benzene 55 | 88.0 gm |
| Styrene | 11.0 gm |
| N,N'-Dimethylaminoethyl methacrylate | 11.0 gm |
| (the proportion of crosslinking vinyl monomers: 44%) | |
| Poly(vinyl Pyrrolidone) K-30 | 16.5 gm |
| 2,2'-azobisisobutyronitrile | 8.8 gm |
| Methyl alcohol | 1,000.0 gm |
| Distilled water | 5.0 gm |
| o-Xylene | 220.0 gm |

The above components were placed in a 2 l flask and polymerized at 70° C. in a nitrogen gas atmosphere for 24 hours while stirring. The final conversion achieved in the polymerization reaction was 92%. The polymer particles (Seed Polymer Particles C) thus obtained were examined by a scanning electron microscope to confirm that they are spherical polymer particles having high monodispersibility with an average particle size of 3.0 μ(SD=3%).

| Example 11 <Preparation of Crosslinked Polymer Particles> | |
|---|---|
| Seed Polymer Particles C | 20.35 gm |
| (As solid portion) | |
| Divinyl Benzene 55 | 88.0 gm |
| Styrene | 11.0 gm |
| Methylmethacrylate | 11.0 gm |
| (the proportion of crosslinking vinyl monomers: 44%) | |
| Poly(vinyl Pyrrolidone) K-60 | 16.5 gm |
| 2,2'-azobis(2,4-dimethylvaleronitrile) | 8.8 gm |
| Isopropyl alcohol | 1,000.0 gm |
| Methyl alcohol | 100.0 gm |
| o-Xylene | 250.0 gm |

The above components were placed in a 2 l flask and polymerized at 70° C. in a nitrogen gas atmosphere for 48 hours while stirring. The final conversion achieved in the polymerization reaction was 92%. The polymer particles thus obtained were examined by a transmission electron microscope to confirm that they are spherical polymer particles having high mono-dispersibility with an average particle size of 5.4 μm (SD=5%).

As illustrated above, the present invention provides a simple industrial process for the stable production of highly crosslinked polymer particles having a comparatively uniform particle size within the particle size range of 0.1–10 μm.

The crosslinked polymer particles of the present invention are very useful in a variety of fields. They can be used, for example, as a plastic film material, particles for blending in fibers, a carrier for chromatography, a standard sample for microscopic examination, a model sample for the measurement of dust, a carrier for the medical inspection of living bodies, an enzyme immobilization carrier, a powder ink, a spacer for microcapsule protection in pressure sensitive copying papers, a pigment for paint, a powdery lubricant, a sensitive layer improver, a spacer for liquid crystal cells, a cosmetic pigment, a pigment for various plastics, and the like.

Obviously, numerous modifications and variations of the present invention are possible in light of the above examples. It is therefore to be understood that within the scope of the appended claims, the invention may be practiced otherwise than as specifically described herein.

What is claimed is:

1. A process for preparing highly crosslinked polymer particles, the process comprising:
   dispersing polymerizable vinyl monomer in a single phase dispersion medium comprising a solvent, said polymerizable vinyl monomer comprising at least 15% by weight of crosslinking vinyl monomer, said solvent comprising at least one organic compound, said polymerizable vinyl monomer being soluble in said solvent, the solubility in water of said polymerizable vinyl monomer being not more than 30% by weight; and
   polymerizing said polymerizable vinyl monomer in the presence of a dispersion stabilizer and a radical polymerization initiator to produce polymer of said polymerizable vinyl monomer, said polymer being insoluble in said solvent.

2. A process according to claim 1, wherein said crosslinking vinyl monomer is one or more compounds selected from the group consisting of compounds having two or more copolymerizable double bonds in the molecule and polyvalent acrylate compounds.

3. A process according to claim 1, wherein said crosslinking vinyl monomer is one or more compounds selected from the group consisting of divinylbenzene, ethylene glycol dimethacrylate, and trimethylolpropane trimethacrylate.

4. A process according to claim 1, wherein said at least one organic compound comprises one or more compounds selected from the group consisting of alcohols, ether alcohols, hydrocarbons, ethers, acetals, ketones, esters, acids, and sulfur- or nitrogen-containing organic compounds.

5. A process according to claim 1, wherein the total amount of said solvent is more than 500 parts by weight per 100 parts by weight of the total weight of said polymerizable vinyl monomer.

6. A process according to claim 1, wherein said dispersion stabilizer comprises one or more compounds selected from the group consisting of poly(vinyl pyrrolidone), poly(vinyl methyl ether), polyethyleneimine, polyacrylic acid, poly(vinyl alcohol), vinyl acetate copolymer, ethyl cellulose, hydroxypropyl cellulose, and sorbitan stearic acid monoester.

7. A process according to claim 1, wherein said radical polymerization initiator comprises one or more compounds selected from the group consisting of 2,2'-azobisisobutyronitrile, 4,4'-azobis(4-cyanopentaonic acid), 2,2'-azobis(2-methylbutyronitrile), 2,2'-azobis(2,4-dimethylvaleronitrile), benzoyl peroxide, lauroyl peroxide, octanoyl peroxide, and 3,3',5-trimethylhexanoyl peroxide.

8. A process according to claim 1, wherein said polymerizing is carried out in the further presence of a co-stabilization agent.

9. A process according to claim 8, wherein said co-stabilization agent is one or more compounds selected from the group consisting of anionic surfactants, nonionic surfactants, quaternary ammonium salts, and long chain alcohols.

10. A process according to claim 1, wherein said polymerizing is carried out by using crosslinked polymer particles as seed particles.

11. A process according to claim 10, wherein said seed particles are crosslinked polymer particles which are produced by dispersing polymerizable vinyl monomer in a solvent, said polymerizable vinyl monomer comprising at least 15% by weight of crosslinking vinyl monomer, said solvent comprising at least one organic compound, said polymerizable vinyl monomer being soluble in said solvent, the solubility in water of said polymerizable vinyl monomer being not more than 30% by weight; and
   polymerizing said polymerizable vinyl monomer in the presence of a dispersion stabilizer and a radical polymerization initiator to produce polymer of said polymerizable vinyl monomer, said polymer being insoluble in said solvent.

12. A process according to claim 1, wherein said polymerizing is carried out by using a latex produced by emulsion polymerization as seed particles.

13. A process as recited in claim 1, wherein said solvent comprises a mixture of at least two organic compounds.

14. A process as recited in claim 1, wherein said solvent further comprises water.

15. A process as recited in claim 13, wherein said solvent further comprises water.

* * * * *